United States Patent
Thibodeaux (10) Patent No.: US 7,191,530 B1
(45) Date of Patent: Mar. 20, 2007

(54) COMPASS ASSEMBLY

(76) Inventor: Vernon J. Thibodeaux, 2519 Central Blvd., Nederland, TX (US) 77627

( * ) Notice: Subject to any disclaimer, the term of this patent is extended or adjusted under 35 U.S.C. 154(b) by 0 days.

(21) Appl. No.: 11/207,028

(22) Filed: Aug. 19, 2005

(51) Int. Cl.
*B43L 9/04* (2006.01)
*G01B 3/10* (2006.01)

(52) U.S. Cl. .................... 33/27.032; 33/27.03; 33/759; 33/770; 33/668

(58) Field of Classification Search ............ 33/27.032, 33/27.01, 27.02, 27.03, 27.031, 27.033, 27.06, 33/27.07, 759, 760, 761, 767, 768, 769, 770, 33/771, 668, 484, 485
See application file for complete search history.

(56) References Cited

U.S. PATENT DOCUMENTS

| | | | | |
|---|---|---|---|---|
| 1,638,914 A | * | 8/1927 | Brush | 33/431 |
| 2,607,990 A | * | 8/1952 | Payamps | 33/27.03 |
| 3,021,599 A | * | 2/1962 | Odom | 33/275 R |
| 3,269,015 A | * | 8/1966 | Barker | 33/27.08 |
| 3,292,262 A | * | 12/1966 | Moll | 33/27.03 |
| 3,651,574 A | * | 3/1972 | Burkart | 33/1 SB |
| 3,774,308 A | * | 11/1973 | Jurentkuff | 33/493 |
| 4,103,426 A | * | 8/1978 | Robin | 33/27.03 |
| 4,835,870 A | * | 6/1989 | Rauch et al. | 33/1 C |
| 4,914,830 A | | 4/1990 | Legare | |
| 5,253,421 A | * | 10/1993 | Landmark | 33/27.03 |
| 5,295,308 A | | 3/1994 | Stevens et al. | |
| 5,735,052 A | | 4/1998 | Lin | |
| 5,782,007 A | | 7/1998 | Harris | |
| D432,035 S | | 10/2000 | Harris | |
| 6,223,443 B1 | | 5/2001 | Jacobs | |
| 6,226,885 B1 | * | 5/2001 | Korich | 33/760 |
| 6,553,684 B2 | * | 4/2003 | Jenkins et al. | 33/770 |
| 7,062,859 B1 | * | 6/2006 | Revnell | 33/32.1 |

* cited by examiner

*Primary Examiner*—G. Bradley Bennett
*Assistant Examiner*—Amy R. Cohen (57) ABSTRACT

A compass assembly includes a tape measure apparatus that includes a housing and a tape measure removably extendable outwardly of the housing. A disc has a top side, a bottom side and a peripheral edge. The disc has a centrally located opening extending therethrough. A base is positioned in the opening. A spindle is attached to the base. A pointer is rotatably attached the spindle. A saddle configured to releasably hold the housing is rotatably coupled to the spindle. The housing is mounted on the saddle. A holder configured to releasably hold a writing utensil has an upper side, a lower side and a peripheral wall. A slit extends into the peripheral wall. A fastener releasably secures a free end of the tape to the holder. A writing utensil is removably secured to the peripheral wall with a securing member.

13 Claims, 13 Drawing Sheets

COMPASS ASSEMBLY

BACKGROUND OF THE INVENTION

1. Field of the Invention

The present invention relates to compass devices and more particularly pertains to a new compass device for allowing a person to draw relatively large circular shapes and designs with the aid of an adjustable compass.

2. Description of the Prior Art

The use of compass devices is known in the prior art. U.S. Pat. No. 6,223,443 describes a device for using a tape measure for developing circular patterns. Another type of compass device is U.S. Pat. No. 5,782,007 again allowing a person to use a tape measure for drawing circular patterns. Still yet another such device is found in U.S. Pat. No. 5,295,308 which includes a tape measure that includes a mounting for holding a writing utensil. This allows a person to use that tape measure for making circular patterns of a selected size.

While these devices fulfill their respective, particular objectives and requirements, the need remains for a device that allows a person to use a tape measure for drawing circular patterns and which also includes templates for allowing a person to copy geometric designs a selected size scale. The device should also include means for attaching an axle of the device to a work surface to ensure that the created designs are arcuate and uniform.

SUMMARY OF THE INVENTION

The present invention meets the needs presented above by generally comprising a tape measure apparatus includes a housing, a tape measure that is removably extendable outwardly of the housing, and a tape lock for locking the tape measure. A disc has a top side, a bottom side and a peripheral edge. The disc has a circular shape. The disc has a centrally located opening extending therethrough. A base is removably positioned in the opening. A spindle is removably attached to the base and extends upwardly from the base. The spindle is vertically orientated and is aligned with an axis of the disc. A pointer is rotatably attached to and extends away from the spindle. A saddle configured to releasably hold the housing is rotatably coupled to the spindle and extends away from the pointer. The housing is mounted on the saddle. A holder configured to releasably hold a writing utensil has an upper side, a lower side and a peripheral wall that is attached to and extends between the upper and lower sides. A slit extends into the peripheral wall. A fastener releasably secures a free end of the tape to the holder. A writing utensil is removably secured to the peripheral wall with a securing member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 13 thereof, a new compass device embodying the principles and concepts of the present invention and generally designated by the reference numeral 10 will be described.

As best illustrated in FIGS. 1 through 13, the compass assembly 10 generally comprises a tape measure apparatus that includes a housing 12 and a tape measure 13 that is removably extendable outwardly of the housing 12. The tape measure apparatus is generally conventional and includes a tape lock 15 mounted on the housing 12 for selectively locking the tape measure 13 with respect to the housing.

Figure 6:
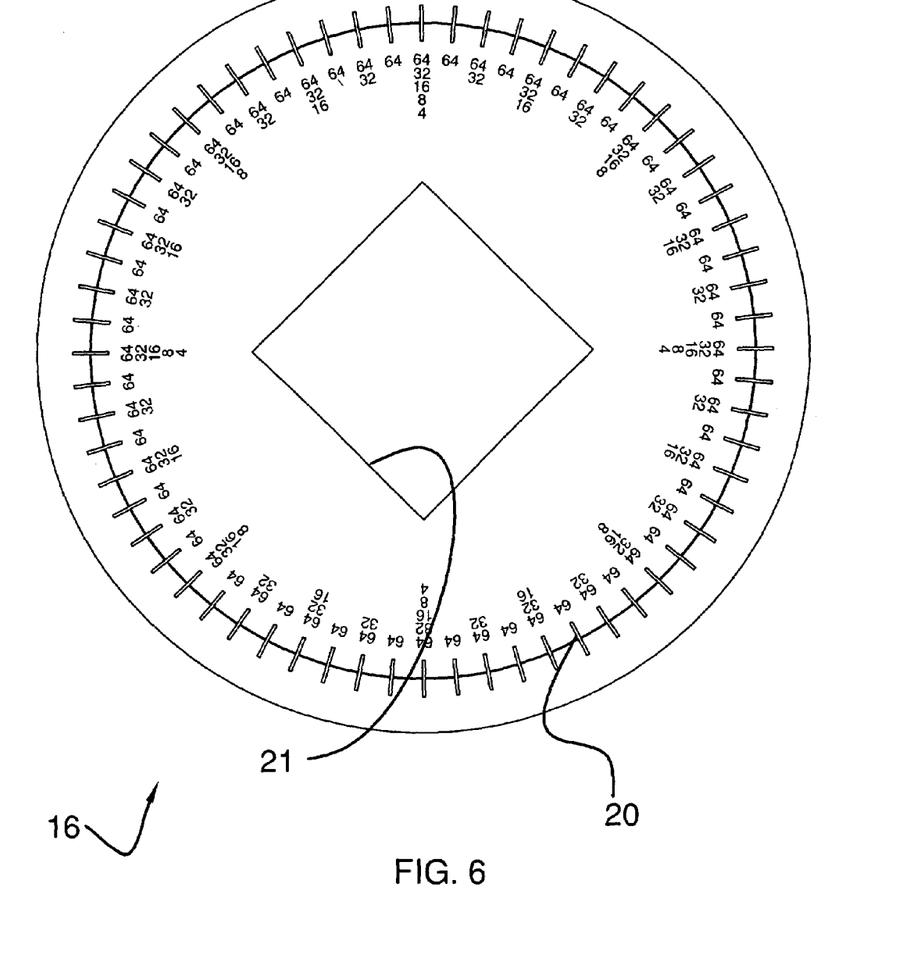
FIG. 6 is a top view of a disc of the present invention.
Figure 7:
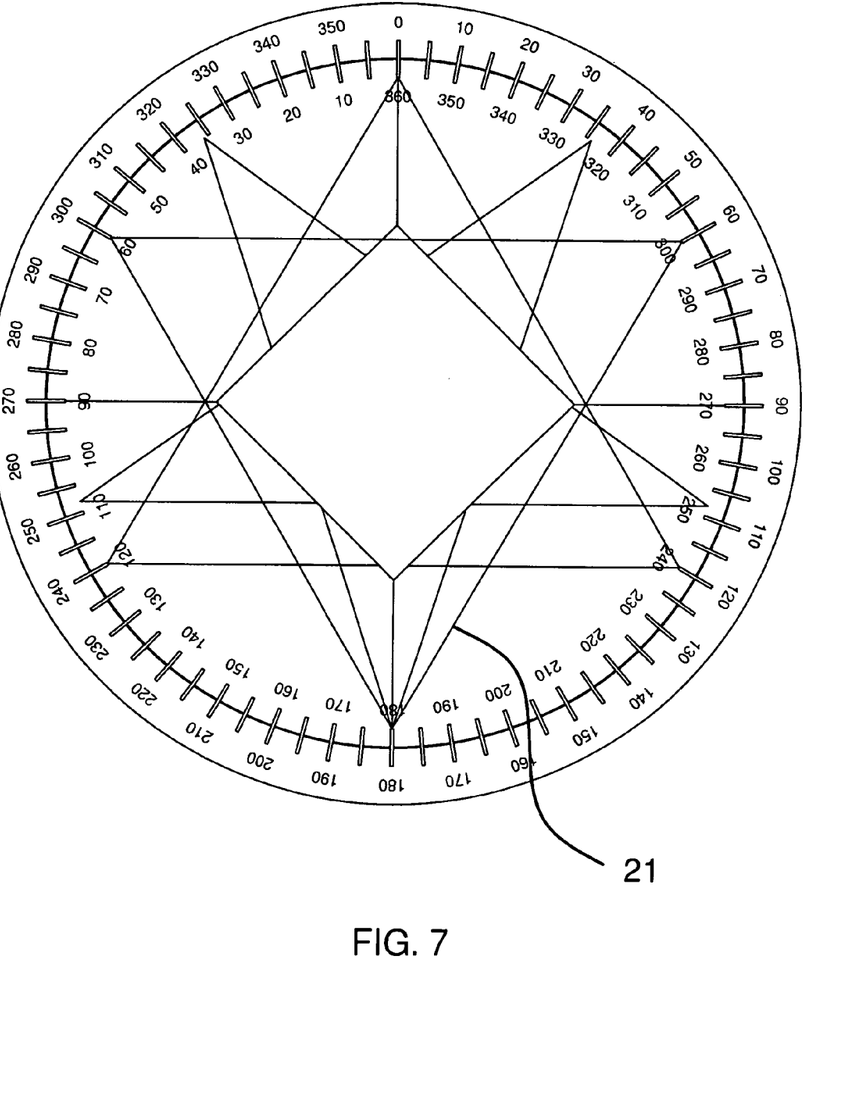
FIG. 7 is a top view of an alternate disc of the present invention.

A disc 16 has a top side 17, a bottom side 18 and a peripheral edge 19. The disc 16 has a circular shape. Measurement indicia 20 are positioned on the top side 17 and shape indicia 21 may also be positioned on the top side 17 as shown in FIGS. 6 and 7. The disc 16 has a centrally located opening 22 extending therethrough. The opening 22 has a non-circular shape.

Figure 1:
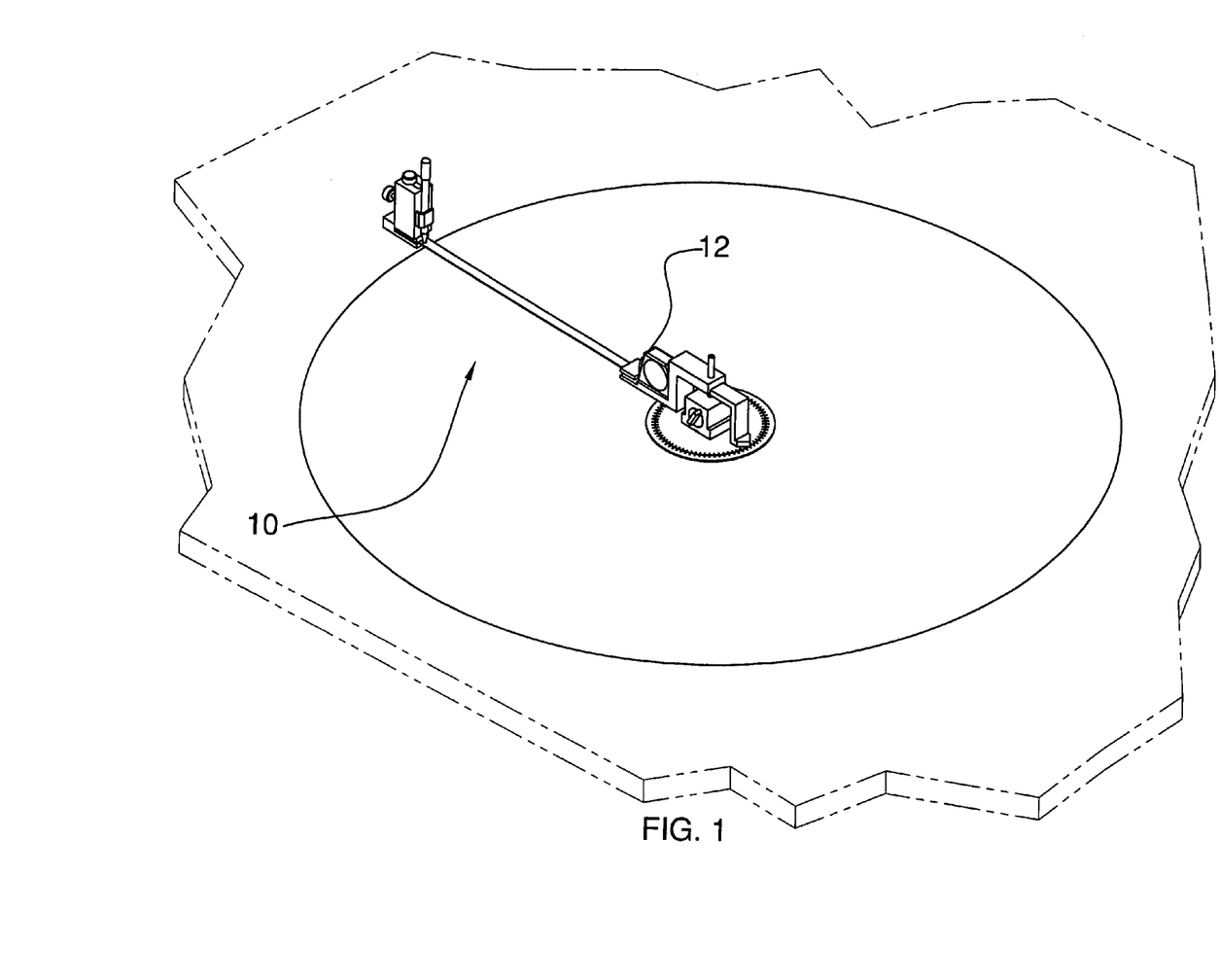
FIG. 1 is a perspective in-use view of a compass assembly according to the present invention.
Figure 2:
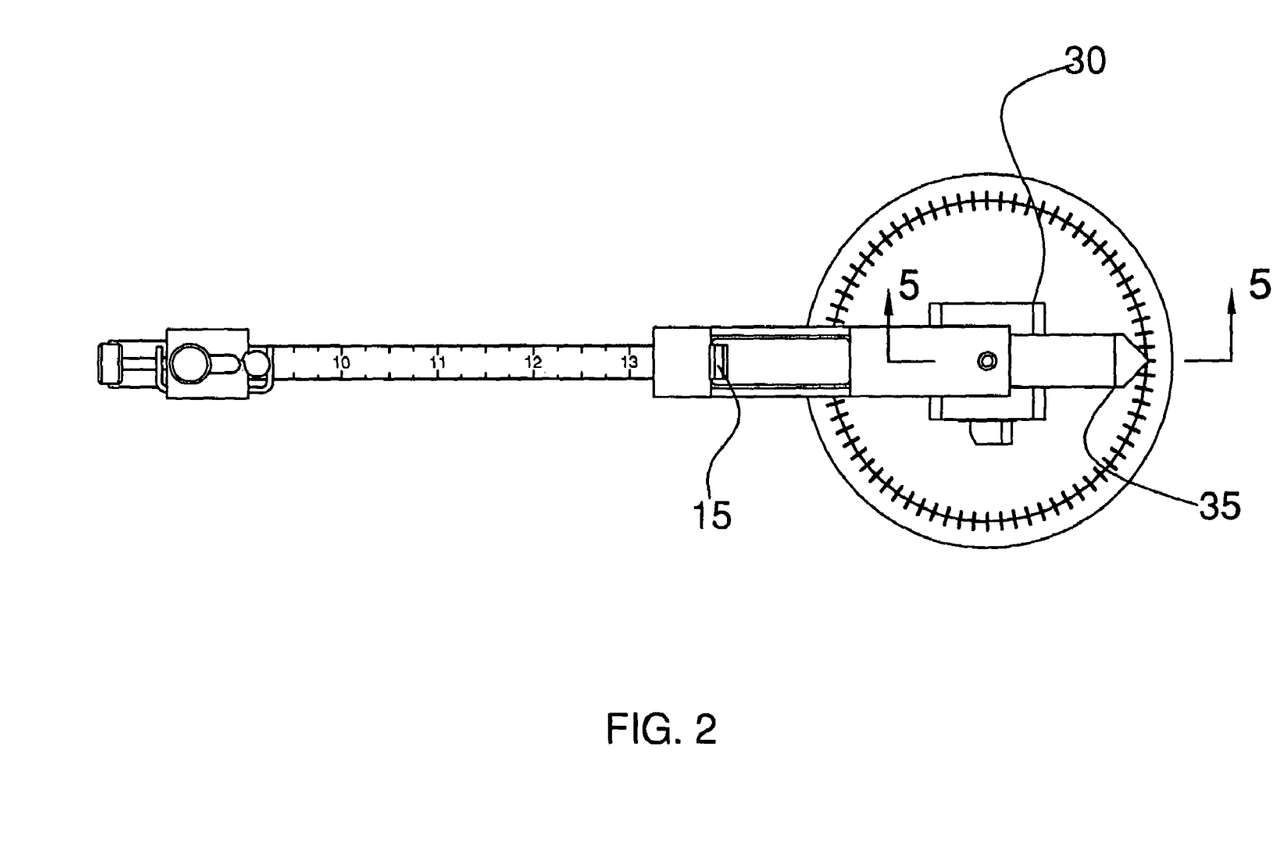
FIG. 2 is a top view of the present invention.
Figure 3:
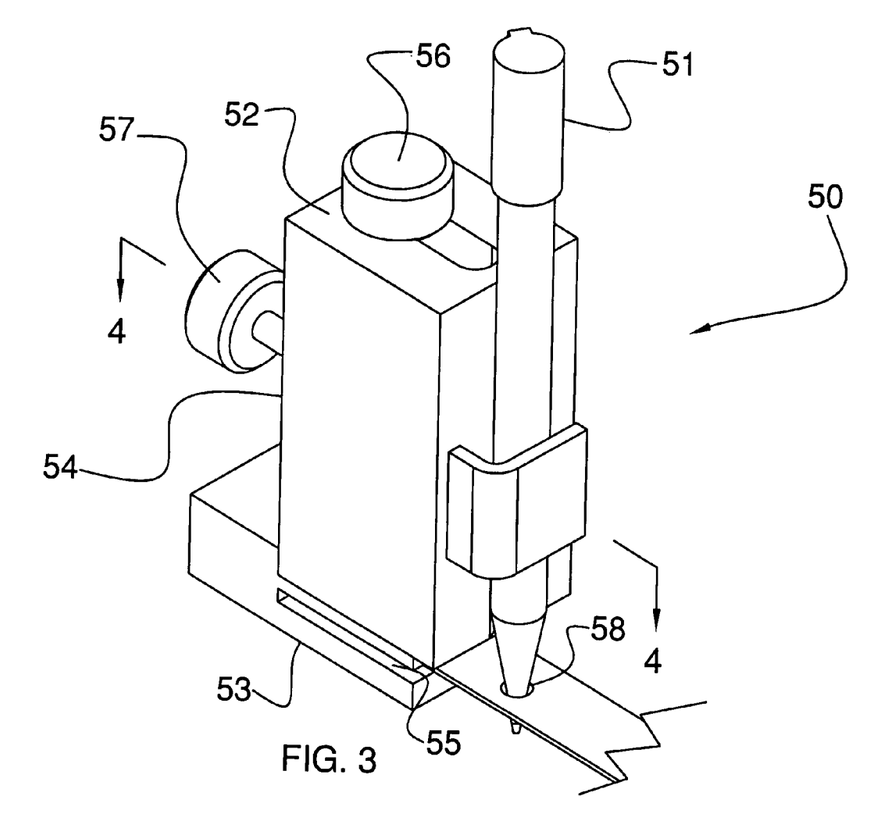
FIG. 3 is a perspective view of writing utensil holder of the present invention.
Figure 4:
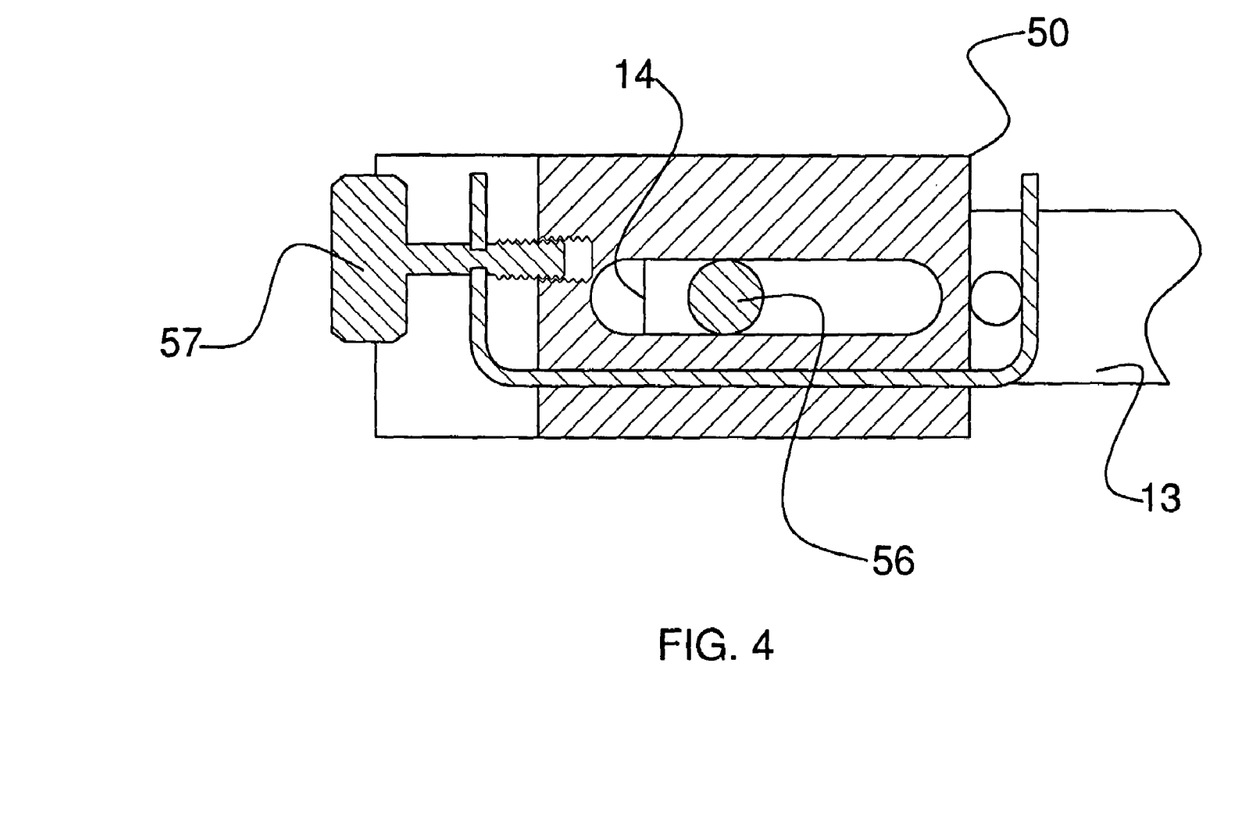
FIG. 4 is a cross-sectional view taken along line 4—4 of FIG. 3 of the present invention.
Figure 5:
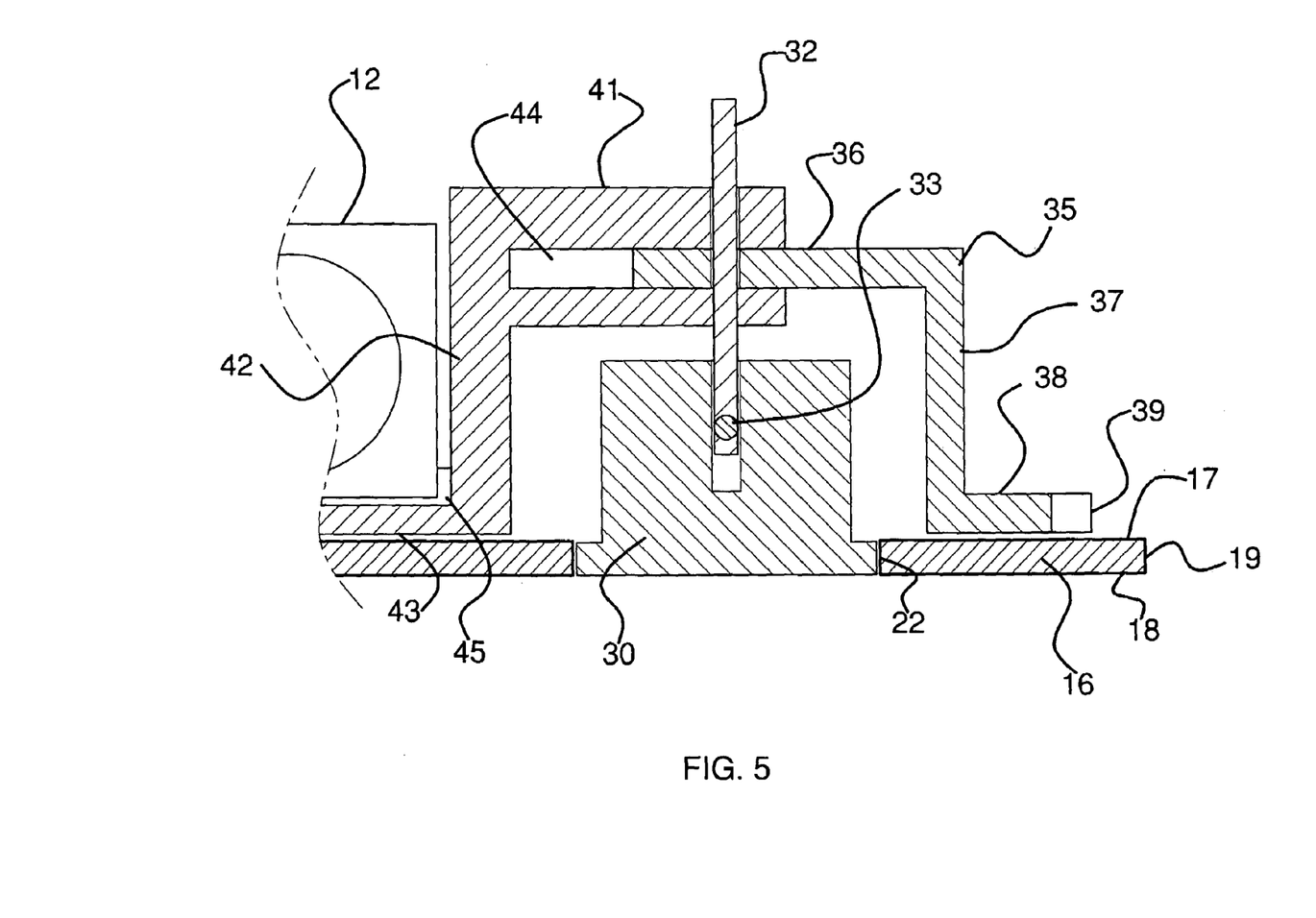
FIG. 5 is a cross-sectional view taken along line 5—5 of FIG. 2 of the present invention.
Figure 8:
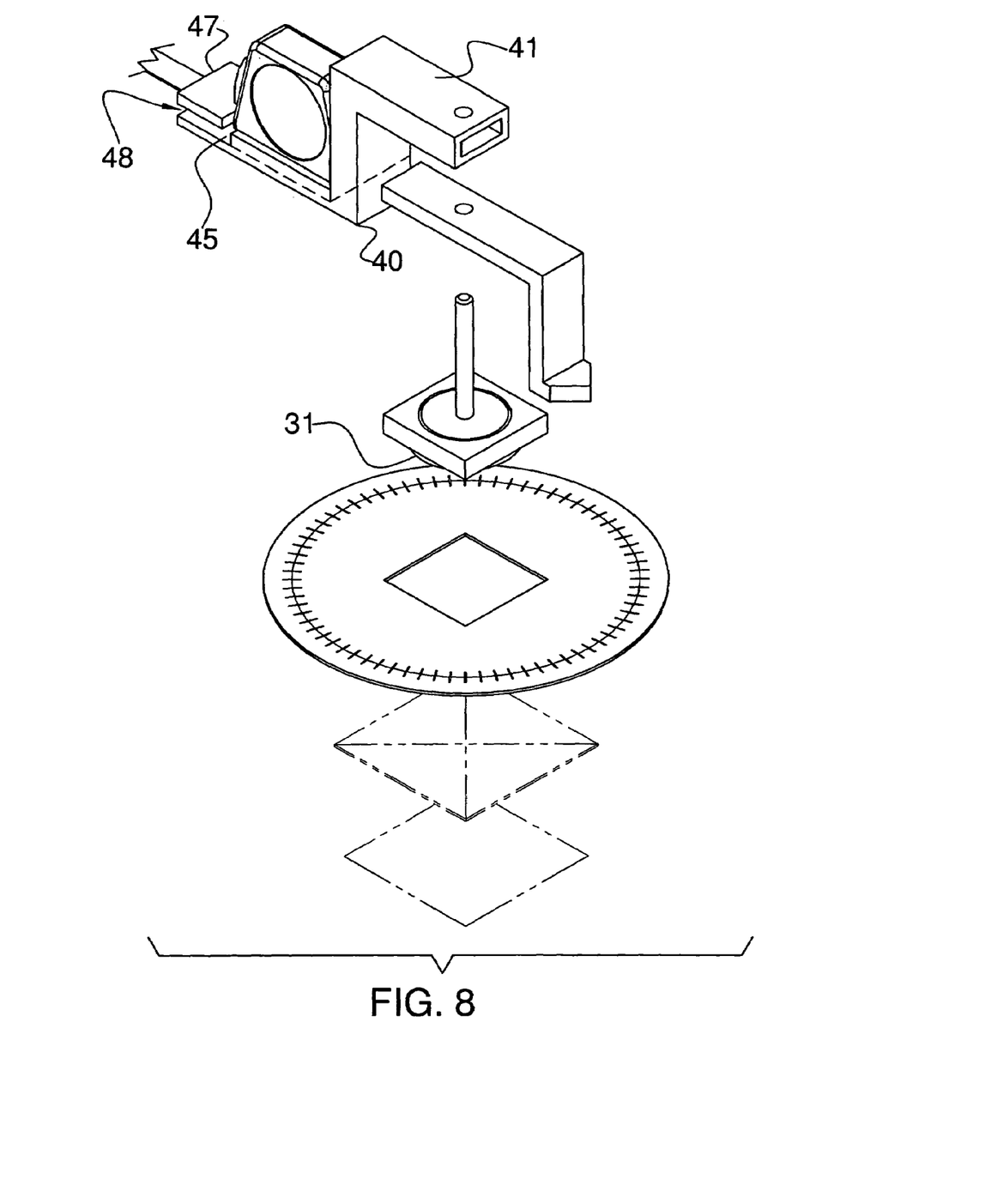
FIG. 8 is a perspective view of a first alternate base of the present invention.
Figure 9:
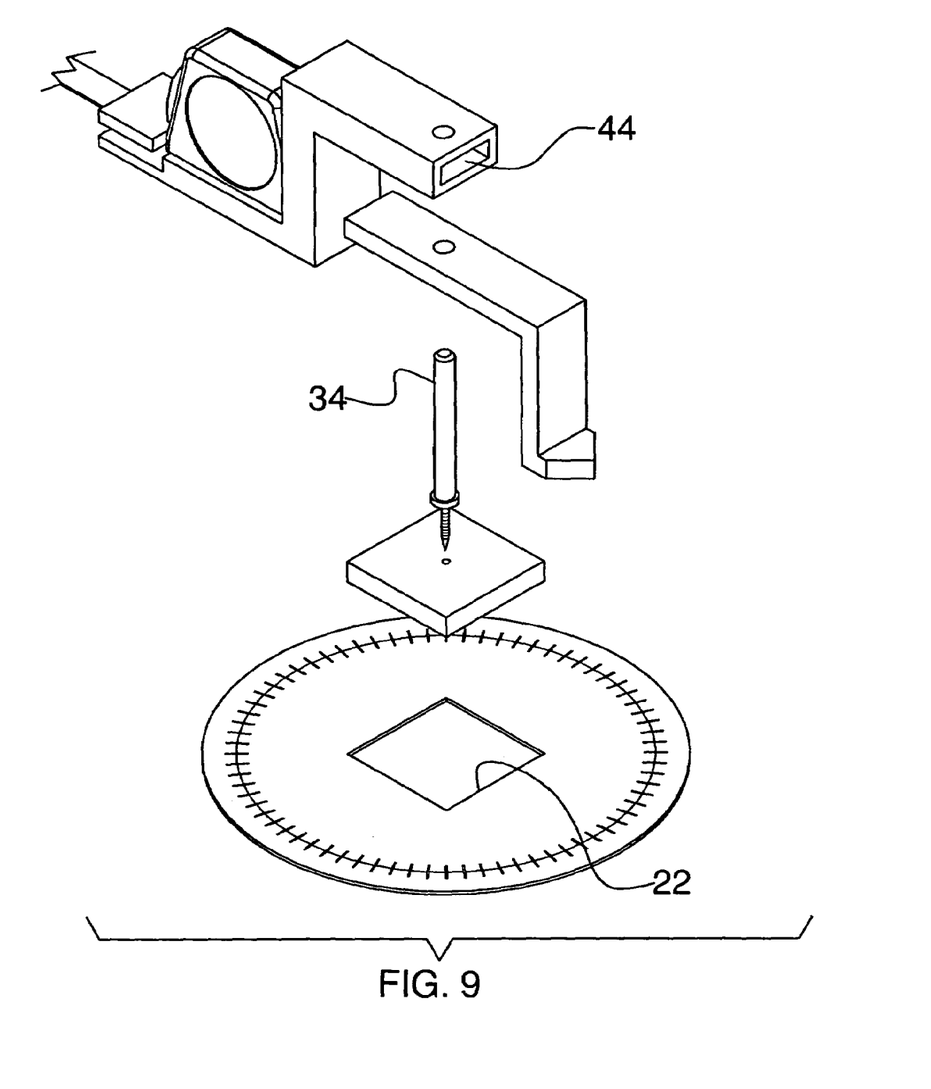
FIG. 9 is a perspective view of a second alternate base of the present invention.
Figure 10:
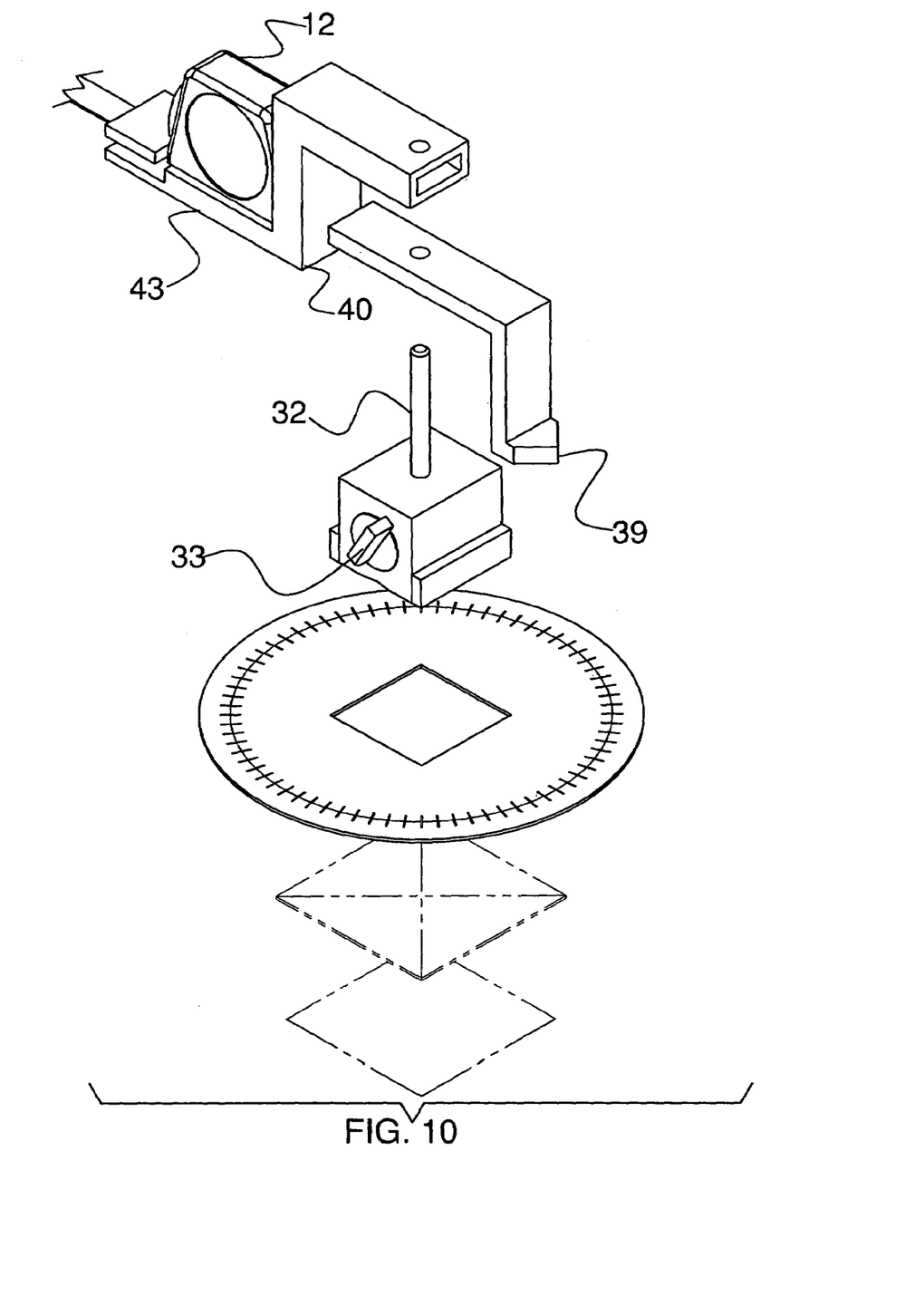
FIG. 10 is a perspective view of the present invention.

A base 30 is removably positioned in the opening 22. The base 30 has a same size and shape as the opening 22 to prevent the base from rotating with respect to the disc 16. FIG. 5 shows a base 30 that comprises a magnetic material for securing the base 30 to a metallic panel. FIG. 8 shows a suction cup 31 attached to the bottom of the base 30 to attach it to a smooth, planar object. A spindle 32 is removably attached to the base 30 and extends upwardly from the base. The spindle 32 is vertically orientated and is aligned with an axis of the disc 16. A conventional fastener 33 may be extended into the base 30 for holding the spindle 32 in the base 30. An alternate spindle 34 is shown in FIG. 9 which includes a threaded fastener extendable through the base 30 and into a table for securing the base 30 to a table.

A pointer 35 is rotatably attached to and extends away from the spindle 32. The pointer 35 includes a pair of arms 36, 38 attached together by a central member 37. The arms 36, 38 are vertically spaced from each other and extend in opposite directions with respect from each other. The spindle 32 extends through a first of the arms 36 so that a second of the arms 38 is adjacent to the top side 17 of the disc 16. A free end 39 of the second arm 38 is pointed.

A saddle 40 is provided that is configured to releasably hold the housing 12. The saddle 40 is rotatably coupled to the spindle 32 and extends away from the pointer 35. The saddle 40 includes a pair of legs 41, 43 and a middle portion 42 extending between and being attached to the legs 41, 43. The legs 41, 43 are vertically spaced from each other and extend in opposite directions with respect to each other. An upper leg 41 of the legs is rotatably coupled to the spindle 32. The upper leg 41 has an outer end having pocket 44 extending therein. The first arm 36 is positioned in the pocket 44 so that first arm 36 and the upper leg 41 are linearly aligned with each other. A lower leg 43 of the legs has a depression 45 therein for receiving the housing 12. The lower leg 43 has a free end 47 that has an aperture 48 therein extending into the depression 45. The tape 13 is extendable through the aperture 48 when the housing 12 is in the depression 45.

A holder 50 is configured to releasably hold a writing utensil 51. The holder 50 has an upper side 52, a lower side 53 and a peripheral wall 54 that is attached to and extends between the upper 52 and lower 53 sides. A slit 55 extends into the peripheral wall 54. A free end 14 of the tape 13 is extendable into the slit 55. A fastener 56 releasably secures the tape in the slit 55. A writing utensil 51 is removably secured to the peripheral wall 54 with a securing member 57. The writing utensil 51 extends through an aperture 58 in the tape 13.

Figure 11:
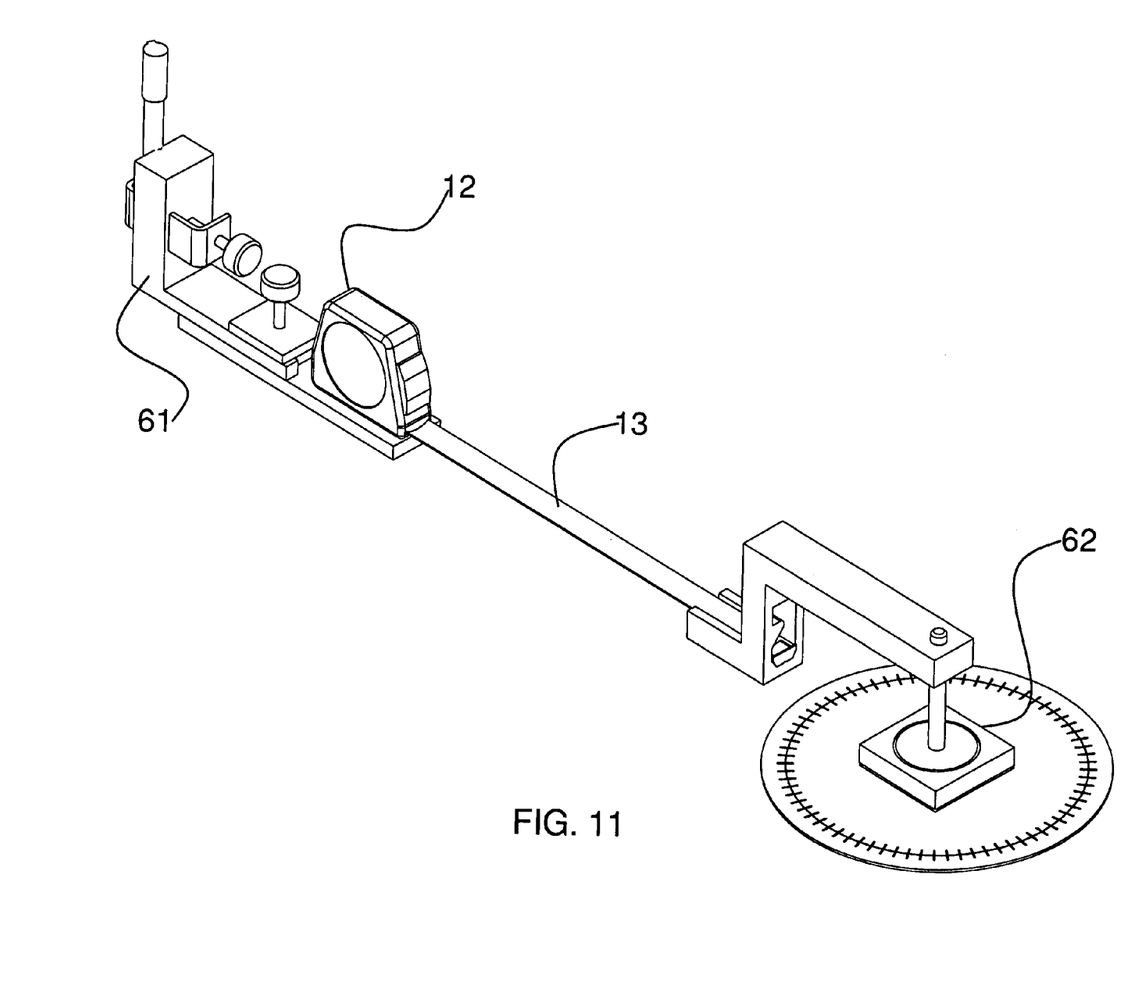
FIG. 11 is a perspective view of a second embodiment of the present invention.
Figure 12:
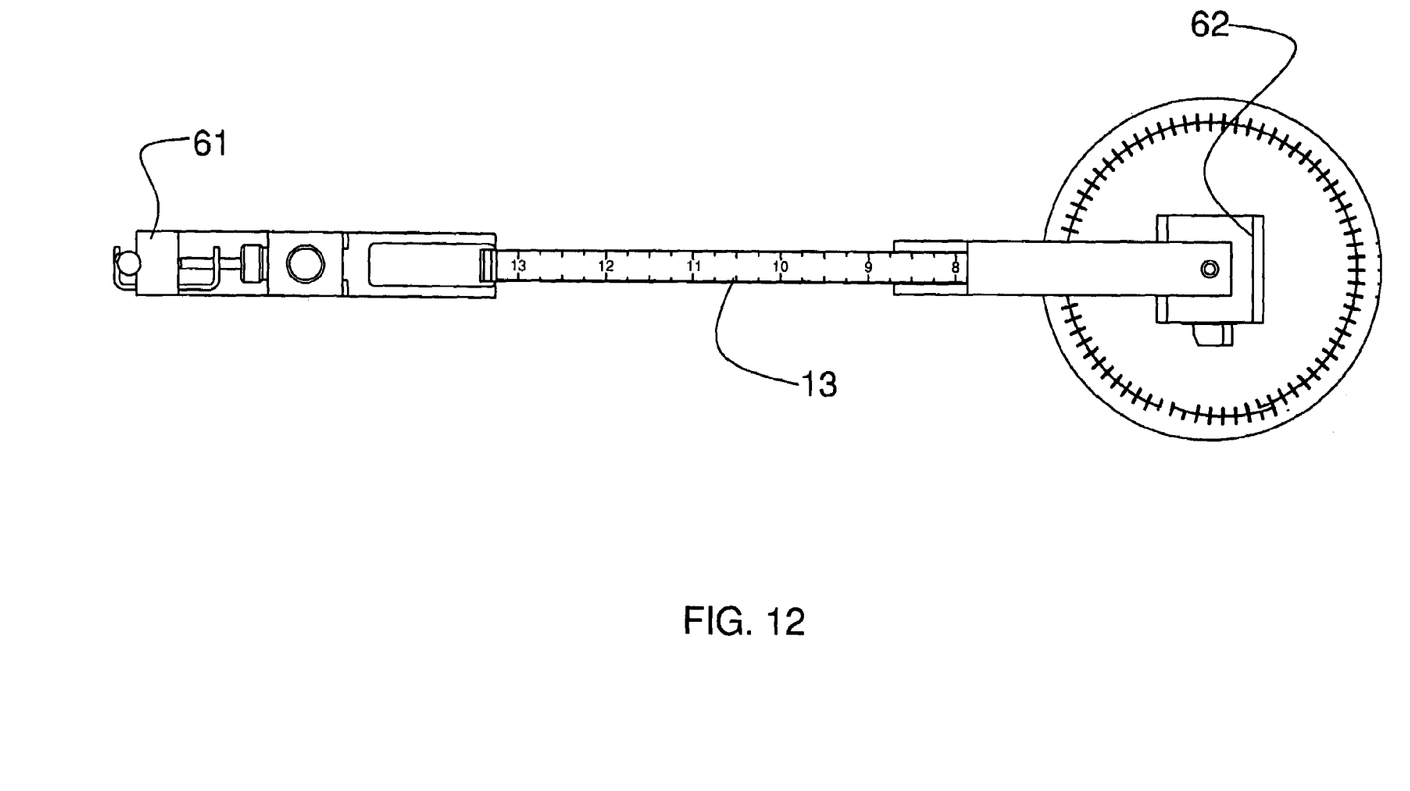
FIG. 12 is a top view of the second embodiment of the present invention.
Figure 13:
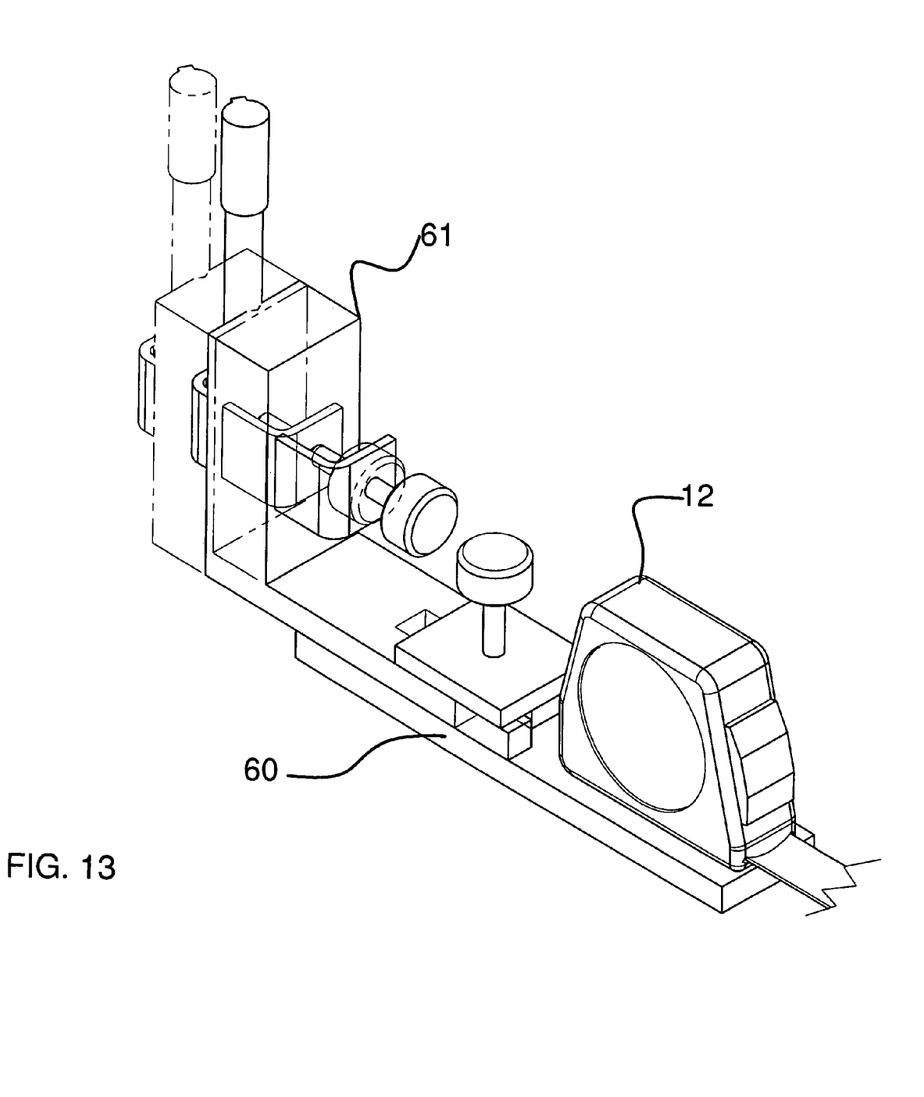
FIG. 13 is a perspective view of the second embodiment of the present invention.

A second embodiment is shown in FIGS. 11–13 and includes a saddle 60 being attached to a writing utensil holder 61 and wherein the base 62 is adapted for receiving a free end 14 of the tape 13.

In use, the assembly 10 is used to draw relatively large circular shapes and to form designs. The disc 16 may include design indicia for a person to follow in order to mimic those designs. The user may select the size of a circle or other design being created by selecting the length of the tape 13 extended outwardly from the housing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A compass assembly comprising:
   a tape measure apparatus including a housing and a tape measure being removably extendable outwardly of said housing, a tape lock being mounted on said housing for selectively locking said tape measure with respect to said housing;
   a disc having a top side, a bottom side and a peripheral edge, said disc having a circular shape, said disc having a centrally located opening extending therethrough;
   a base being removably positioned in said opening;
   a spindle being removably attached to said base and extending upwardly from said base, said spindle being vertically orientated and being aligned with an axis of said disc;
   a pointer being rotatably attached to and extending away from said spindle, said pointer including a pair of arms attached together by a central member, said arms being vertically spaced from each other and extending in opposite directions with respect from each other, said spindle extending through a first of said arms such that a second of said arms is adjacent to said top side of said disc, a free end of said second arm being pointed;
   a saddle configured to releasably hold said housing, said saddle being rotatably coupled to said spindle and extending away from said pointer, said housing being mounted on said saddle;
   a holder configured to releasably hold a writing utensil, said holder having an upper side, a lower side and a peripheral wall being attached to and extending between said upper and lower sides, a slit extending into said peripheral wall, a fastener releasably securing a free end of said tape to said holder; and
   a writing utensil being removably secured to said peripheral wall with a securing member.

2. The assembly according to claim 1, further including measurement indicia being positioned on said top side.

3. The assembly according to claim 1, further including shape indicia being positioned on said top side.

4. The assembly according to claim 1, wherein said base comprises a magnetic material.

5. The assembly according to claim 1, wherein said saddle includes a pair of legs and a middle portion extending between and attached to said legs, said legs being vertically spaced from each other and extending in opposite directions with respect to each other, an upper leg of said legs being rotatably coupled to said spindle, said upper leg having an outer end having a pocket extending therein, said first arm being positioned in said pocket such that first arm and said upper leg are linearly aligned with each other, a lower leg of said legs having a depression therein for receiving said housing, said lower leg having a free end having an aperture therein extending into said depression, said tape being extendable through said aperture when said housing is in said depression.

6. The assembly according to claim 1, wherein said saddle includes a pair of legs and a middle portion extending between and attached to said legs, said legs being vertically spaced from each other and extending in opposite directions with respect to each other, an upper leg of said legs being rotatably coupled to said spindle, a lower leg of said legs having a depression therein for receiving said housing, said lower leg having a free end having an aperture therein extending into said depression, said tape being extendable through said aperture when said housing is in said depression.

7. A compass assembly comprising:
   a tape measure apparatus including a housing and a tape measure being removably extendable outwardly of said housing, a tape lock being mounted on said housing for selectively locking said tape measure with respect to said housing;
   a disc having a top side, a bottom side and a peripheral edge, said disc having a circular shape, measurement indicia being positioned on said top side, shape indicia being positioned on said top side, said disc having a centrally located opening extending therethrough, said opening having a non-circular shape;

a base being removably positioned in said opening, said base having a same size and shape as said opening, said base comprising a magnetic material;

a spindle being removably attached to said base and extending upwardly from said base, said spindle being vertically orientated and being aligned with an axis of said disc;

a pointer being rotatably attached to and extending away from said spindle, said pointer including a pair of arms attached together by a central member, said arms being vertically spaced from each other and extending in opposite directions with respect from each other, said spindle extending through a first of said arms such that a second of said arms is adjacent to said top side of said disc, a free end of said second arm being pointed;

a saddle configured to releasably hold said housing, said saddle being rotatably coupled to said spindle and extending away from said pointer, said saddle including a pair of legs and a middle portion extending between and attached to said legs, said legs being vertically spaced from each other and extending in opposite directions with respect to each other, an upper leg of said legs being rotatably coupled to said spindle, said upper leg having a pocket extending therein, said first arm being positioned in said pocket such that first arm and said upper leg are linearly aligned with each other, a lower leg of said legs having a depression therein for receiving said housing, said lower leg having a free end having an aperture therein extending into said depression, said tape being extendable through said aperture when said housing is in said depression;

a holder configured to releasably hold a writing utensil, said holder having an upper side, a lower side and a peripheral wall being attached to and extending between said upper and lower sides, a slit extending into said peripheral wall, a free end of said tape being extendable into said slit, a fastener releasably securing said tape in said slit; and a writing utensil being removably secured to said peripheral wall with a securing member, said writing utensil extending through an aperture in said tape.

8. A compass assembly comprising:

a tape measure apparatus including a housing and a tape measure being removably extendable outwardly of said housing, a tape lock being mounted on said housing for selectively locking said tape measure with respect to said housing;

a disc having a top side, a bottom side and a peripheral edge, said disc having a circular shape, said disc having a centrally located opening extending therethrough;

a base being removably positioned in said opening;

a spindle being removably attached to said base and extending upwardly from said base, said spindle being vertically orientated and being aligned with an axis of said disc;

a pointer being rotatably attached to and extending away from said spindle;

a saddle configured to releasably hold said housing, said saddle being rotatably coupled to said spindle and extending away from said pointer, said housing being mounted on said saddle, said saddle including a pair of legs and a middle portion extending between and attached to said legs, said legs being vertically spaced from each other and extending in opposite directions with respect to each other, an upper leg of said legs being rotatably coupled to said spindle, a lower leg of said legs having a depression therein for receiving said housing, said lower leg having a free end having an aperture therein extending into said depression, said tape being extendable through said aperture when said housing is in said depression;

a holder configured to releasably hold a writing utensil, said holder having an upper side, a lower side and a peripheral wall being attached to and extending between said upper and lower sides; and a writing utensil being removably secured to said peripheral wall with a securing member.

9. The assembly according to claim 8, further including measurement indicia being positioned on said top side.

10. The assembly according to claim 8, further including shape indicia being positioned on said top side.

11. The assembly according to claim 8, wherein said base comprises a magnetic material.

12. The assembly according to claim 8, wherein said pointer includes a pair of arms attached together by a central member, said arms being vertically spaced from each other and extending in opposite directions with respect from each other, said spindle extending through a first of said arms such that a second of said arms is adjacent to said top side of said disc, a free end of said second arm being pointed.

13. The assembly according to claim 8, wherein said peripheral wall of said holder has a slit extending therein, said free end of said tape being extendable into said slit, a fastener releasably securing said tape in said slit.

* * * * *